(12) United States Patent
Xuan et al.

(10) Patent No.: US 6,297,910 B1
(45) Date of Patent: Oct. 2, 2001

(54) LASER-TEXTURING DATA ZONE ON A MAGNETIC DISK SURFACE BY USING DEGENERATIVE TWO WAVE MIXING

(75) Inventors: Jialuo Jack Xuan, Milpitas; Zhengda Pan, Newark; Chung-Yuang Shih, Cupertino, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/613,557

(22) Filed: Jul. 10, 2000

Related U.S. Application Data

(63) Continuation of application No. 09/311,362, filed on May 13, 1999, now Pat. No. 6,169,631.
(60) Provisional application No. 60/086,363, filed on May 19, 1998.

(51) Int. Cl.[7] .................................................. G02B 27/10
(52) U.S. Cl. .................... 359/618; 219/121.77; 425/385; 264/400
(58) Field of Search ............................ 359/618; 700/166; 360/135; 264/400; 219/121.77; 425/385, 174.4, 135

(56) References Cited

U.S. PATENT DOCUMENTS

| | | |
|---|---|---|
| 5,869,209 | 2/1999 | Shimiizu et al. . |
| 5,940,304 | 8/1999 | Barenboim et al. . |
| 6,021,106 | 2/2000 | Welch et al. . |
| 6,185,168 * | 2/2001 | Kato et al. .................... 369/44.23 |
| 6,198,714 * | 3/2001 | Yoo et al. ........................ 369/112 |

* cited by examiner

*Primary Examiner*—Georgia Epps
*Assistant Examiner*—Tim Thompson
(74) *Attorney, Agent, or Firm*—McDermott, Will & Emery

(57) ABSTRACT

A laser-optical wave mixing technique is provided for forming a high density textured data zone in an efficient and accurate manner. A single coherent laser beam of wavelength $\lambda$ is split into two beams with roughly the same intensity. These two beams are then overlapped with a cross angle of $2\theta$ and focused at the disk surface, resulting in an intensity grating thereon. The intensity grating creates a wave-form pattern consisting of a series of high-energy laser beam lines that will heat the target surface and make surface topographical changes accordingly.

1 Claim, 4 Drawing Sheets

High-Intensity Grating Patterns from Wave-Mixing

High-Intensity Grating Patterns from Wave-Mixing

High-Intensity Grating Patterns from Wave-Mixing

LASER-TEXTURING DATA ZONE ON A MAGNETIC DISK SURFACE BY USING DEGENERATIVE TWO WAVE MIXING

This application is a continuation of application Ser. No. 09/311,362 filed May 13, 1999 U.S. Pat. No. 6,169,631.

RELATED APPLICATIONS

This application claims priority from provisional patent application Ser. No. 60/086,363, filed May 19, 1998, the entire disclosure of which is hereby incorporated by reference herein.

This application contains subject matter that is related to subject matter disclosed in U.S. patent applications Ser. No. 09/125,152, filed Aug. 10, 1998, now U.S. Pat. No. 6,147,322, and U.S. patent application Ser. No. 09/311,358 filed May 13, 1999, the entire disclosures of which are incorporated herein by reference.

TECHNICAL FIELD

The present invention relates to the recording, storage and reading of magnetic data, particularly rotatable magnetic recording media, such as thin film magnetic disks having textured surfaces for cooperating with magnetic transducer heads. The invention has particular applicability to high density magnetic recording media for exhibiting low noise.

BACKGROUND

Magnetic disks and disk drives are conventionally employed for storing data in magnetizable form. Typically, one or more disks are rotated on a central axis in combination with data transducer heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk.

In operation, the magnetic disk is normally driven by the contact start stop (CSS) method, wherein the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on an air bearing as the disk rotates. The magnetic head unit is arranged such that the head can be freely moved in the radial direction of the disk in this floating state allowing data to be recorded on and retrieved from the surface of the disk at a desired position.

Upon terminating operation of the disk drive, the rotational speed of the disk decreases and the head begins to slide against the surface of the disk again and eventually stops in contact with and pressing against the disk. Thus, the transducer head contacts the recording surface whenever the disk is stationary, accelerated from a stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

During reading and recording operations, it is desirable to maintain each transducer head as close to its associated recording surface as possible, i.e., to minimize the flying height of the head without contacting or damaging the data storage portion of the disk. This objective becomes particularly significant as the areal data recording density increases. Thus, a smooth recording surface is preferred, as well as a smooth opposing surface of the associated transducer head, for permitting the head and the disk to be positioned in close proximity, with an attendant predictability and consistency of behavior of the air bearing supporting the head. However, if the head surface and recording surface are too flat, the precision match of these surfaces gives rise to excessive stiction and friction during the start up and stopping phases, thereby causing wear to the head and recording surfaces eventually leading to what is referred to as "head crash." Thus, there are competing goals of reducing head/disk friction and minimizing transducer flying height.

In order to satisfy these competing objectives, the recording surfaces of magnetic disks are conventionally provided with a roughened surface to reduce the head/disk friction by techniques referred to as "texturing." Conventional texturing techniques involve polishing the surface of a disk substrate to provide a texture thereon prior to subsequent deposition of layers, such as an underlayer which is typically chromium or a chromium-alloy, a magnetic layer, a protective overcoat which typically comprises carbon, and a lubricant topcoat, wherein the textured surface on the substrate is intended to be substantially replicated on the outer surface of the magnetic disk.

The escalating requirements for high areal recording density impose increasingly greater requirements on thin film magnetic media in terms of coercivity, squareness, low medium noise and narrow track recording performance. In addition, increasingly high density and large-capacity magnetic disks require increasingly small flying heights, i.e., the distance by which the head floats above the surface of the disk in the CSS drive. The requirement to further reduce the flying height of the head imposed by increasingly higher recording density and capacity render it particularly difficult to satisfy the requirements for controlled texturing to avoid head crash.

Texture on magnetic recording media surfaces has been required, also, in data storage zones to orient the crystallization of the magnetic layer along circumferential lines to improve the signal-to-noise ratio and other magnetic performance. Conventional techniques comprise a mechanical operation, such as polishing. One such technique is to apply slurries with coolant for scratching the substrate surface. The slurries are inserted between a tape and the substrate with a certain normal force applied to the tape while the disk is in relative motion to the tape. The substrate surface is scratched by the slurry particles during this process, the resulting scratched lines known as surface texture lines. Because of the random distribution of the slurry particle sizes, these texture lines are randomly spaced with different scratch widths and depths. Also, because of the inconsistency of slurry concentration supplied to each disk, the scratch line width and depth vary from disk to disk. With conventional mechanical texturing techniques, it is extremely difficult to provide a clean textured surface due to debris formed by mechanical abrasions. Moreover, the surface inevitably becomes scratched during mechanical operations, which contributes to poor glide characteristics and higher defects. Such relatively crude mechanical polishing, with attendant non-uniformities and debris, does not provide a surface with an adequately specular finish or with adequate microtexturing to induce proper crystallographic orientation of a subsequently deposited magnetic layer on which to record and read information, i.e., a data zone.

FIG. 1 is illustrative of surface profiles obtained from typical mechanical texturing techniques. Asperities between scratch lines, which are created by the mechanical texturing method, vary greatly in size of up to the order of 50 Å high on a surface of roughness average Ra of only about 5 Å. The surface profile is a relatively random profile, with no specified number of peaks, nor defined heights of the asperities and depths of the valleys. As recording density requirements continue to increase, the size of each magnetic bit becomes smaller. As a result of random spacing of texture lines and random unacceptable scratch asperities and depths, more defects are found during magnetic testing.

An alternative technique to mechanical texturing comprises the use of a laser light beam focused on an upper surface of a nonmagnetic substrate. See, for example, Ranjan et al., U.S. Pat. No. 5,062,021, in which an NiP plated Al substrate is polished to a specular finish, and then the disk is rotated while directing pulsed laser energy over a limited portion of the radius, to provide a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995. See, also, U.S. Pat. Nos. 5,550,696 and 5,595,791.

The above-identified copending application Ser. No. 09/125,152, applies laser texturing to obtain an ultra-fine pattern with elongated asperities having low asperity height. While there are no deep valleys on the media surface, the elongated asperities are randomly elongated, created by a laser beam that is randomly modulated and focused on the data storage media surface. Although asperity elongation provides a more limited randomness in the circumferential direction, nonuniformity in height imposes negative effects on signal-to-noise ratio and magnetic performance as data density becomes increasingly greater.

Accordingly, there exists a need for a magnetic recording medium having data storage surfaces configured to accommodate the decrease in bit size concomitant with higher density storage. Such a configuration should provide an acceptable limit in the number of bits that are disqualified or missing in magnetic testing, which in the prior art are due to random spacing of deep scratches or texture lines. A further need exists for a laser micro-machining technique to form such high density storage surfaces in a practical manner.

Copending U.S. patent application Ser. No. 09/311,358, addresses these needs with a method for forming a textured data zone on a magnetic recording disk in which a focused laser beam is continuously applied to a substrate in a path of generally circumferential direction on the disk surface between inner and outer radii of a data storage zone. Application of the laser beam occurs while the substrate is rotated at a relatively constant first speed and the focused beam is moved radially at a relatively constant second speed, significantly slower. The resulting configuration is a continuous grooved structure in which a plurality of generally parallel and circumferential continuous ridges are separated by grooves. An underlayer, magnetic layer, protective overcoat and lubricant topcoat are then deposited, the textured surface of the substrate surface being substantially replicated on subsequently deposited layers. One or more data storage tracks are then formed in the magnetic layer of each of the resulting ridges.

This method provides improved magnetic layer crystallization orientation with a more regular geometric texture configuration within acceptable ranges. However, use of a single laser beam, accurately focused at a very fine point on the substrate surface, requires continuous application through a number of revolutions equal in number to the number of revolutions of the groove that is formed. As the substrate surface is traversed radially at rate in the range of about 0.001 inches per second (IPS) to 0.010 IPS, the time during which relatively constant power and high accuracy focus must be continuously administered between the inner and outer disk radius is considerable.

There continues to be a need for new laser-optical techniques for micro-machining on magnetic recording media substrate surfaces to form regularly-spaced ridges/grooves with enhanced magnetic layer crystallization orientation.

SUMMARY OF THE INVENTION

The present invention fulfills the aforementioned needs. An advantage of the present invention is that a new laser-optical wave mixing technique is provided for forming a high density textured data zone in an efficient and accurate manner. A single coherent laser beam of wavelength $\lambda$ is split into two beams with the same intensity. These two beams are then overlapped with a cross angle of $2\theta$ and focused at the disk surface, resulting in an intensity grating thereon. The intensity grating creates a wave-form pattern consisting of a series of high-energy laser beam lines that will heat the target surface and make surface topographical changes accordingly.

This technique is realized, at least in part, by positioning a beam expander in the output beam path of a laser source, splitting the expanded beam output into two coherent component beams of the same polarization and approximately the same intensity, and closely focusing these beams at the substrate surface. The resulting overlapped laser beam is applied to the disk during rotation of the disk and while the focus point is moved radially with respect to the disk. Focusing is effected by means of a lens and two mirrors, each mirror being positioned in a path of a component beam to reflect the beam toward the focus point. The lens may be placed advantageously downstream of the beam expander to focus the expanded beam at the beam splitter. Alternatively, a lens may be positioned advantageously in both reflected paths downstream of the mirrors to focus both beams on the disk surface.

Additional aspects and advantages of the present invention will become readily apparent to those skilled in this art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

Figure 1:
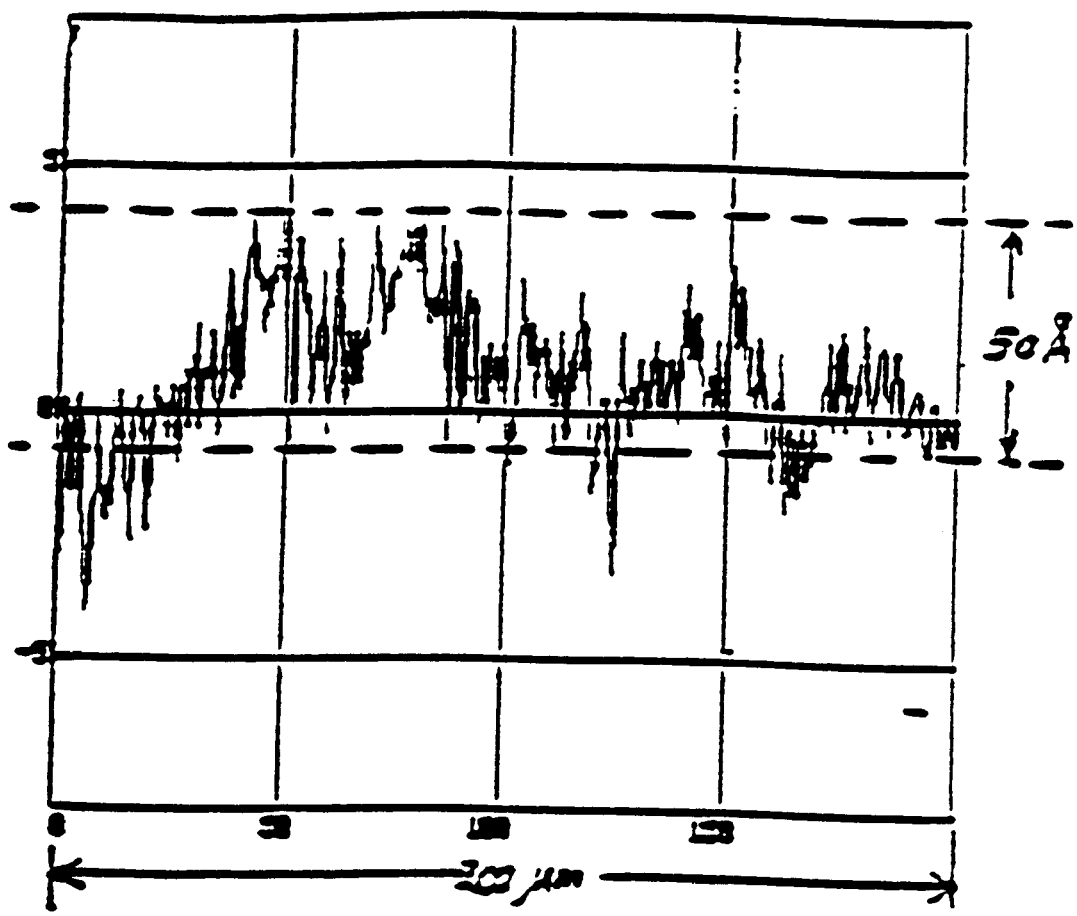
FIG. 1 is an illustration of surface profiles obtained from typical prior art mechanical texturing techniques.
Figure 2:
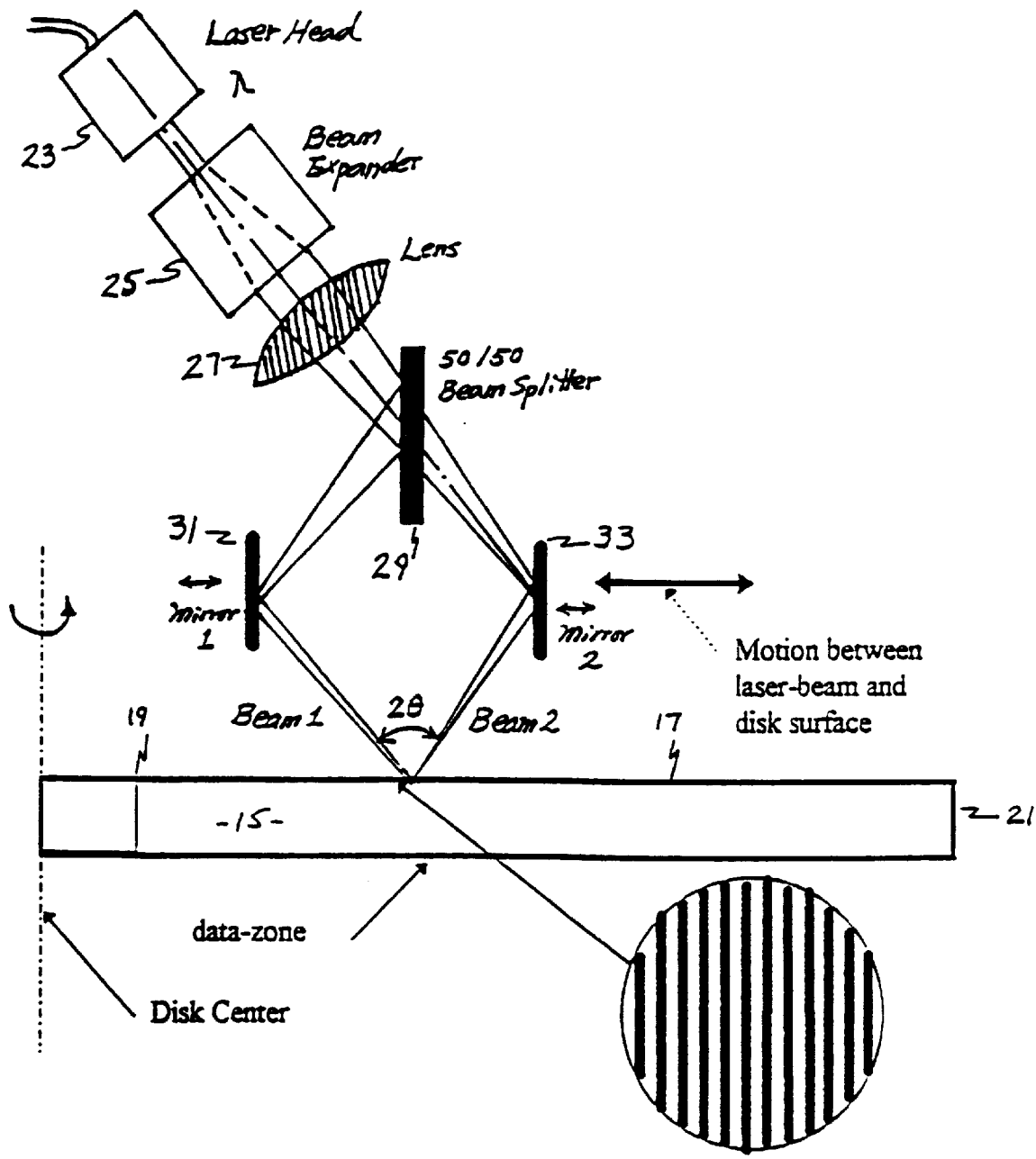
FIG. 2 is a diagram of a first embodiment of the invention by which laser wave mixing is used for surface texturing.

FIG. 2 illustrates the use of laser micro-machining techniques to form the substrate surface with regularly spaced ridges and grooves to enhance the magnetic layer crystallization orientation. Disk substrate 15, having upper and lower surfaces, is allocated a data zone 17 between inner radius 19 and outer radius 21, at which one or both substrate surfaces are processed to form data storage areas. Laser head 23 produces a coherent laser beam, which is expanded by beam expander 25. The expanded beam output by the beam expander is focused by lens 27 and applied to beam splitter 29. The applied beam is split substantially equally in the preferred embodiments. Satisfactory operation can be obtained with different beam split ratios. The split component beams are directed to mirrors 31 and 33, which appropriately reflect both of these component beams to a focused point on surface 17 of the substrate surface. Application of the laser beams occurs while the substrate is rotating and in relative radial movement with respect to the focused laser beam. Either the laser beam generating apparatus or the disk may be driven for radial movement with respect to the other.

It can thus be appreciated that a single coherent laser beam of wavelength $\lambda$ is split into two beams with the same intensity. Then these two beams with a cross angle of $2\theta$ will be overlapped and focused at the disk surface, resulting in an intensity grating at the disk surface. The intensity grating creates a wave-form pattern consisting of a series of high-energy laser beam lines that will heat the target surface and make surface topographical changes accordingly. The spacing or period $\Gamma$ between grating lines is determined as:

$$\Gamma = \lambda/(2 \sin\theta).$$

The spacing or period $\Gamma$ is also proportional to the resulting surface texture line-densities. By controlling the laser power and the relative movement between the final focused laser beam and the disk, the disk surface can be laser-textured to have high-low profiles.

Laser head 23 may produce a continuous-waveform (CW-laser) laser or a pulsed laser, which may run at high pulse frequency with long pulse width of wavelength in the order of 1064 nm. The substrate material may comprise any material conventionally employed for substrates in manufacturing magnetic recording media, for example, nickel-phosphorus coated aluminum or aluminum alloy. From the starting, inner radius 19 of the data zone, while the disk is rotating, the focused laser beam is moved radially towards the outer radius at a proper linear speed until the ending radius 21 of the data zone is reached. The focused laser beam provides accurate heat energy to the surface while the disk is rotating and sliding.

Figure 3:
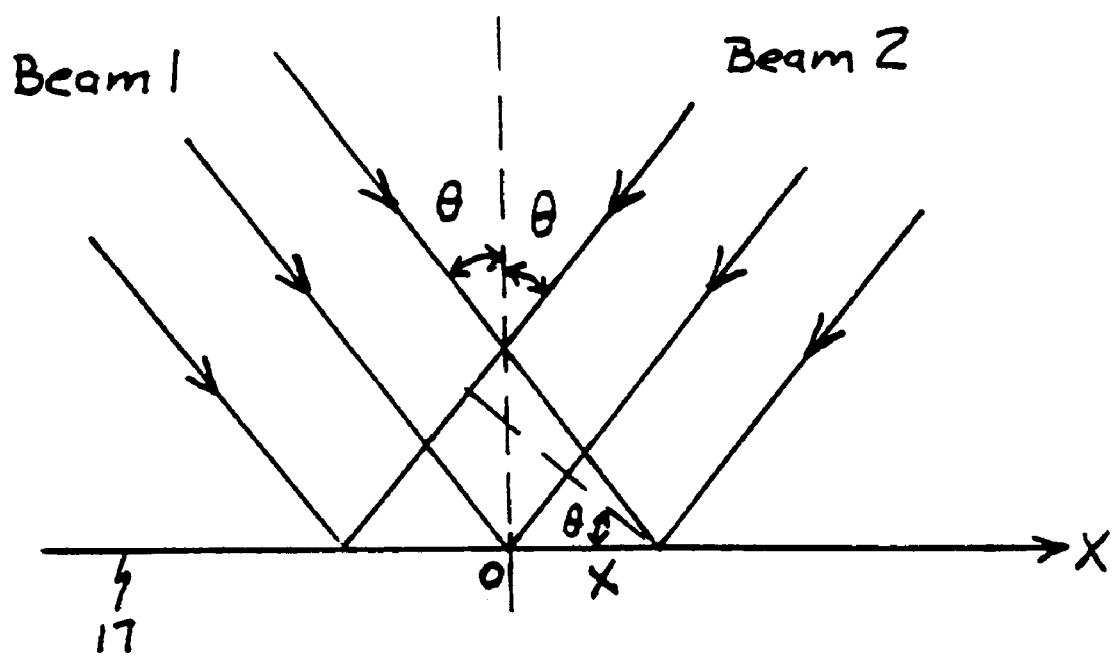
FIG. 3 is a diagram illustrating wave mixing intensity grating.

Mixing the two component beam waveforms produces intensified line sets at the substrate surface. The length path difference between these two waveforms is smaller than the coherent length of the laser beam to thereby to produce a high contrast intensity grating pattern. This grating pattern is used for surface texturing. FIG. 3 is an illustration of the mixing of the beams to obtain intensity grating at surface 17. The optical path difference (OPD) between the two incident beams at the position x is $$OPD = 2|x|\sin\theta$$

For two coherent beams with the same polarization, the constructive interference, i.e., maximum intensity, occurs when $$OPD = n \cdot \lambda \quad \text{(n: integer)}$$

where $I = I_1 + I_2 + 2 E_1 E_2$ ($I_1$, $I_2$ are intensities, and $E_1$, $E_2$ are fields of the two incident beam at the surface, respectively; $\lambda$ is the wavelength of the single source coherent laser beam.)

Destructive interference, i.e., minimum intensity, occurs when $$OPD = (n + 1/2) \cdot \lambda \quad \text{(n: integer)}$$

where $I = I_1 + I_2 - 2 E_1 E_2$

Therefore, a spatial intensity pattern is formed at the overlapped spot of the disk surface. This pattern has been termed the "intensity grating."

The coherence length is the distance between two positions along the light propagation direction that still maintains a fixed phase relation to effect interference. The coherence length can be determined as $$l_c = \frac{c}{\Delta\nu} = \left[\Delta\left(\frac{1}{\lambda}\right)\right]^{-1}$$

where $\Delta\nu$ and $\Delta(1/\lambda)$ is the line width of a Gaussian beam in frequency (Hz) and wave number (cm$^{-1}$) units, respectively.

The optical path difference should be less than the coherence length of the laser line, preferably within 10% of the coherence length. Satisfactory results were obtained with, for example, laser power larger than 0.03 $\mu J/(\mu m)^2$ when using a nanosecond pulsed laser. With a CW-laser, laser power larger than 5 mW/$(\mu m)^2$ produced satisfactory results.

Figure 4:
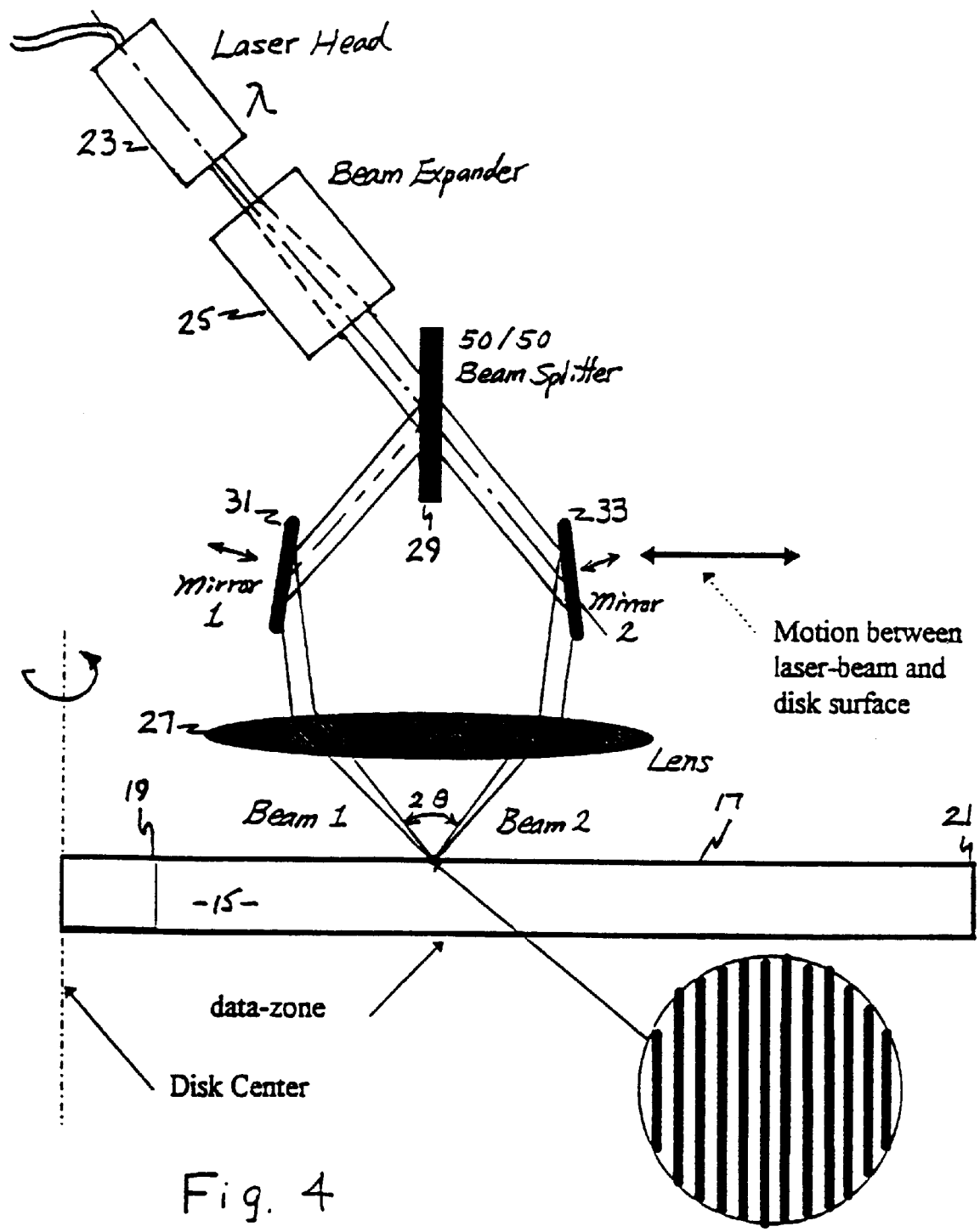
FIG. 4 is a diagram of a second embodiment of the invention by which laser wave mixing is used for surface texturing.

FIG. 4 is a diagram of a second embodiment of the invention by in which lens 27 has been relocated. In this embodiment, the focusing lens is the last component in the optical train. This diffraction limited focusing lens will focus the two component collimated parallel beams to the same spot. The lens has a shorter focal length than the lens of FIG. 2 as it is closer to the surface. This construction permits obtaining the required light intensity with less laser power.

Satisfactory results were obtained with, for example, an intensity of 0.03 $\mu J$ $(\mu m)^2$ using a nanosecond pulse laser. For a typical high repetition laser with 30 $\mu J$/pulse, the focused spot size can be 1000 $(\mu m)^2$, which corresponds to a diameter of about 35 $\mu m$. Using a lens with a focal length between 100–150 mm, a laser beam has been found to satisfactorily focus down to this required spot size.

Satisfactory parameters for the invention were found to be, for coherence length $L_c$, a range of about 1 cm to 15 cm, for OPD, a range of about 0 to 0.2 $L_c$, for laser power, a range of 1W to 50W, and for lens focal length, a range of about 5 cm to 20 cm. Particularly advantageous results were obtained for coherence length $L_c$, a range of about 5 cm to 10 cm, for OPD, a range of about 0 to 0.1 $L_c$, for laser power, a range of 10W to 20W, and for lens focal length, a range of about 10 cm to 15 cm.

Only certain embodiments of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. Apparatus comprising:

a laser; and means for forming a textured, high intensity grating pattern on a surface of a magnetic disk with said laser.

* * * * *